United States Patent Office 3,309,117
Patented Mar. 14, 1967

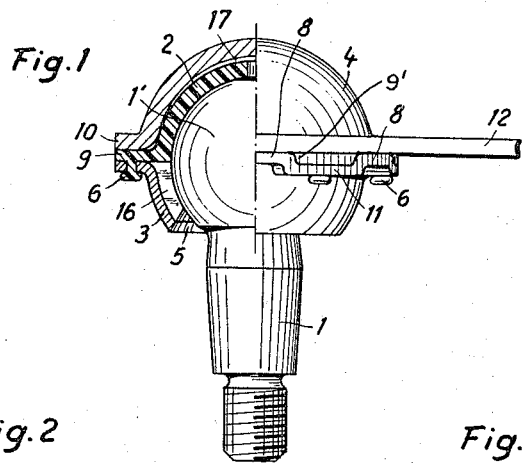
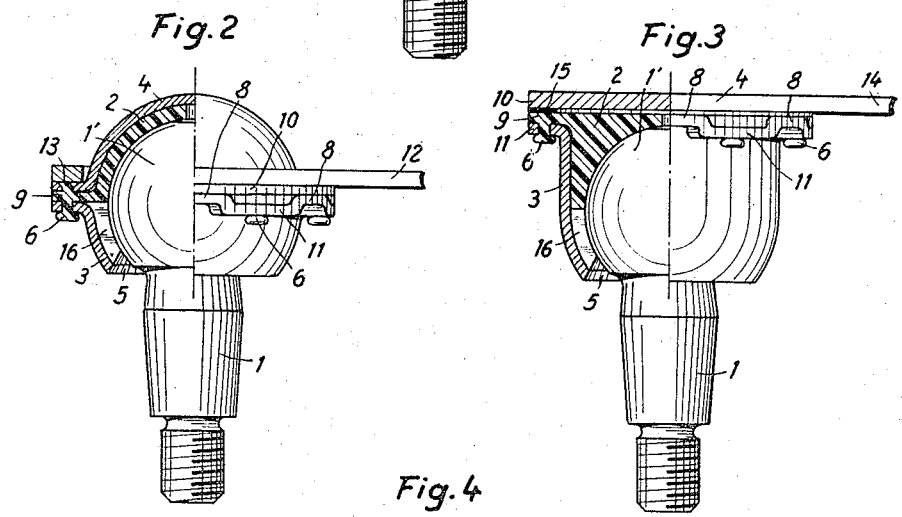
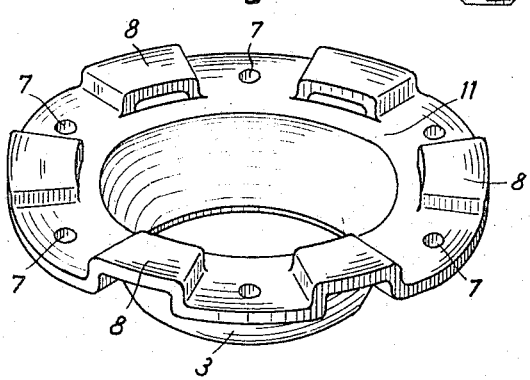

3,309,117
BALL-AND-SOCKET JOINTS
Rudolf Gottschald, Meererbusch, Germany, assignor to Langen Viktor, sole responsible partner of the firm A. Ehrenreich & Cie, Dusseldorf-Oberkassel, Germany
Filed Nov. 15, 1962, Ser. No. 237,802
Claims priority, application Germany, Nov. 25, 1961
E 22,016
5 Claims. (Cl. 287—87)

This invention relates to ball-and-socket joints which may be used, for example, to support the steered wheels of motor vehicles at the free ends of links which are carried by the vehicle chassis.

One kind of such joint has an outer casing which is divided transversely into two parts and an inner bearing lining of synthetic plastic material inside the casing to support the ball head. The casing parts enclose the bearing lining and have flanges by means of which the casing parts are connected together. With this type of connection the flanges must be arranged so that the abutting surfaces of the flanges form a seal to prevent any penetration of water and dirt between them into the joint. This accuracy in the mating of the flanges is difficult to achieve in practice particularly when the two casing parts do not originate from the same manufacturers as is frequently the case when the joint is one for supporting the steered wheel of a motor vehicle. In this case one casing part is frequently made integrally with the link which carries the wheel. Moreover, irrespective of the tolerance between the synthetic plastic lining and the ball head, the casing parts must be at a definite distance from one another to ensure that the joint has the necessary smoothness.

According to the invention, the bearing lining of a joint of the kind described has a collar which is secured between the two flanges on the casing parts and which is formed with apertures, the flange on one part of the casing being formed with projections which extend through the apertures in the collar and bear against the flange of the other part of the casing to act as spacers.

The interconnected casing parts are thus at a predetermined distance so that the connection between the parts of the casing and their tightening have no influence whatever on the smooth operation of the joint. Furthermore the casing is completely sealed by the collar.

Preferably the collar of the bearing lining has a number of projections which extend through and are secured in corresponding openings in the flange of one of the parts of the casing so that this part of the casing and bearing lining form a unitary sub-assembly.

A removable spacing disc may be provided between the collar of the bearing lining and one of the flanges.

Two examples of a joint constructed in accordance with the present invention are illustrated in the accompanying drawings, in which:

FIGURE 1 is a side elevation wtih parts in section of one joint;
FIGURE 2 is a similar view of a slightly modified joint;
FIGURE 3 is a similar view of a third joint; and
FIGURE 4 is a perspective view of one of the casing parts of one or other of the joints.

The three joints comprise a pin 1 with a ball 1', a bearing lining 2 which almost completely encloses the ball 1' and which, on the side facing the pin, has slots 16 in the axial direction of the pin, and an outer casing of sheet steel which surrounds the bearing lining 2 and is formed from two parts 3 and 4. The bearing lining 2 is made of synthetic plastic material.

In FIGURES 1 and 2 the outer casing is divided in the plane of the equator of the ball 1'. The two halves of the casing are connected together, for example by rivets (not shown), after the assembly of the joint.

The bearing lining 2 for the ball has a collar 9, while the two casing parts each have a flange 10 and 11. The collar 9 is gripped between the two flanges 10 and 11. The collar has apertures 9'. To correspond to these openings, one of the flanges, the flange 11 on the casing part 3 on the pin side in the example illustrated, is formed with projecting lugs 8. These engage through the apertures in the collar 9 and when the joint is assembled they bear against the flange 10, as will be apparent from the right-hand half of FIGURES 1 to 3.

Alternatively, the lugs may be provided on the flange 10 of the other casing part 4. Similarly, the lugs may be disposed partly on one and partly on the other flange.

The pin 1 emerges from the casing through an opening 5 in the part 3.

The collar 9 of the bearing lining 2 has projections 6 which extend through and are gripped in openings 7 in the flange 11 of the casing part 3, so that these two form a unitary sub-assembly. Alternatively, the collar 9 may be connected to the flange 11 in some other way, for example by the action of heat.

In FIGURE 1 one casing part 4 is formed integrally with a link 12 which is arranged to connect a wheel of a motor vehicle to the chassis of the vehicle, the wheel being supported by the joint. In FIGURE 2 the casing is inserted into the link 12 and is connected to the link in a suitable way, for example, by riveting the casing flange to it. In FIGURE 2, the collar 9 of the bearing lining has additional projections 13 which are secured in openings in the flange 10 of the casing part 4.

In the example shown in FIGURE 3, the casing part 4 is formed by the flat end of a connecting link 14. This example shows the use of a removable and replaceable spacing disc 15 of sheet metal between the projections 8 of the flange 11 and the flange 10. Depending upon the thickness of the disc the slotted part of the bearing shell is pressed with varying degrees of tightness against the ball.

As shown in FIGURE 1, the lining 2 of synthetic plastic can be spaced by a gap 17 from the casing part 4. This gap may be useful because it eliminates the necessity of making this part of the inner surface of the casing very accurately.

I claim:
1. A ball-and-socket joint assembly comprising in combination
   a stud,
   a ball head connected to said stud,
   a housing extending around said ball head and consisting of an upper housing part and a lower housing part,
   a bearing liner mounted in said housing between said ball head and said housing,
   said upper housing part and said lower housing part having a radial outwardly extending flange,
   at least one housing flange having a plurality of projections facing the other housing flange,
   a circumferential flange on said bearing liner extending radially between said upper and lower housing flange,
   said circumferential flange having a plurality of recesses for receiving said projections on said one housing flange,
   said projections on said one housing flange extending through said recesses into contact with said other housing flange.
2. A ball-and-socket joint assembly according to claim 1 wherein said upper housing part is a flat cover member extending over said ball head and integrally connected to a connecting arm.

3. A ball-and-socket joint assembly according to claim 2 wherein a removable disc is disposed between said flange on said bearing liner and the housing flange of said lower housing part.

4. A ball-and-socket joint assembly comprising in combination
   a stud,
   a ball head connected to said stud,
   a housing extending around said ball head and consisting of an upper housing part and a lower housing part,
   a bearing liner mounted in said housing between said ball head and said housing,
   said upper housing part and said lower housing part having a radial outwardly extending flange,
   at least one housing flange having a plurality of projections facing the other housing flange,
   a circumferential flange on said bearing liner extending radially between said upper and lower housing flange substantially at the equator line of said ball head in the axial direction of said stud,
   said circumferential flange having a plurality of recesses for receiving said projections on said one housing flange,
   said projections on said housing flange extending through said recesses into contact with said other housing flange,
   one housing flange having a plurality of spaced apertures,
   said bearing liner having a plurality of corresponding projections for entering said apertures in said one housing flange to connect said bearing liner to said one housing flange.

5. A ball-and-socket joint assembly according to claim 1 wherein said upper housing part is a segmental spherical cup-shaped member complemental to said ball head and integrally connected to a connecting arm.

References Cited by the Examiner

UNITED STATES PATENTS

| | | | |
|---|---|---|---|
| 2,878,047 | 3/1959 | Booth | 280—96.2 |
| 2,919,150 | 12/1959 | Baker. | |
| 2,934,350 | 4/1960 | Herbenar. | |
| 2,999,708 | 9/1961 | Dudash. | |
| 3,026,124 | 3/1962 | Eyb | 280—96.2 |
| 3,086,800 | 4/1963 | Runyon. | |
| 3,089,718 | 5/1963 | Gottschald et al. | |

FOREIGN PATENTS

| | | |
|---|---|---|
| 1,045,816 | 12/1958 | Germany. |
| 817,027 | 7/1959 | Great Britain. |
| 878,147 | 9/1961 | Great Britain. |

CARL W. TOMLIN, *Primary Examiner.*

A. V. KUNDRAT, *Assistant Examiner.*